(12) United States Patent
Ohta

(10) Patent No.: US 7,364,473 B2
(45) Date of Patent: Apr. 29, 2008

(54) CONNECTOR FOR ELECTRONIC DEVICE

(75) Inventor: Shuto Ohta, Los Gatos, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/303,890

(22) Filed: Dec. 16, 2005

(65) Prior Publication Data
US 2007/0141918 A1 Jun. 21, 2007

(51) Int. Cl.
*J01R 13/04* (2006.01)
(52) U.S. Cl. ...................... 439/694; 439/640
(58) Field of Classification Search ............... 439/694, 439/640
See application file for complete search history.

(56) References Cited

U.S. PATENT DOCUMENTS 4,186,983 A * 2/1980 Kaye ........................... 439/350
6,991,467 B1 * 1/2006 Cheng et al. ................. 439/10
2003/0216060 A1 * 11/2003 Oh-Yang ..................... 439/42

* cited by examiner

*Primary Examiner*—Truc Nguyen
(74) *Attorney, Agent, or Firm*—Baker Botts L.L.P.

(57) ABSTRACT

A space-saving and protective peripheral device connector for use with electronic devices, such as laptop computers, is disclosed. The device connector has a housing containing a plug, such as a USB connector, for insertion into a female port of the electronic device. The plug is coupled to a replica port that is orthogonal to the longitudinal axis of the plug. The replica port may be mounted on the housing or attached to the housing using a cable. The device connector may have an inner surface that substantially conforms to the non-planar adjacent surface of the laptop computer.

10 Claims, 4 Drawing Sheets

CONNECTOR FOR ELECTRONIC DEVICE

FIELD OF THE INVENTION

The invention relates generally to the field of computer connectors and is particularly directed to a space saving and bend protecting USB connector.

BACKGROUND OF THE INVENTION

Most personal computers comprise a plurality of ports or connectors for attaching various types of cables associated with peripheral devices. As used herein, the term personal computer is intended broadly to include the wide range of products with computing capability, including desktop, laptop, notebook, tablet, and server computers, as well as personal digital assistants ("PDAs"), video game systems, internet devices, specialized mobile phones and the like. Standardized universal serial bus ("USB") connectors, with well defined specifications, have emerged as the most common type of connector for linking a large variety of peripheral devices to personal computers. Peripheral devices using USB connectors include printers, keyboards, external disk drives, "thumbdrives," pointing devices, video and still cameras, "MP3" players, and the like. USB connectors have also become standard for linking peripheral devices with other types of electronic devices. For example, in some cases it is possible to connect a digital camera directly to a printer using a USB connector.

In common usage, a USB cable has a standard type "A" USB plug which is inserted into a USB socket or port of an upstream device, such as a computer, and a "type B" USB plug at the other end which is connected to the downstream peripheral device. FIG. 2 shows a standard, prior art type "A" USB plug 200 and socket 210. Plug 200 includes a male connector 250, which is adapted to be inserted into socket 210, a body 260, which protrudes from the socket, a cable 270, which protrudes from the body along the longitudinal axis of the connector, and an optional molded strain relief sleeve 280, which prevents the cable from flexing at the point it enters body 260. In accordance with the USB specifications, connector 250 is 12 mm long, body, 260 is 27 mm long, and strain relief sleeve is 9 mm long. Thus, a standard type A USB plug protrudes about 27 to 36 mm from the surface of a computer's USB port.

FIG. 1A shows a cut away view of prior art laptop computer 100, having two ports 110, 120 on a side thereof. Port 110 is a USB port, and port 120 is another type of port, such as a video port. A USB cable 130 inserted into USB port 110. As described, the connector used to couple USB cable 130 with computer 100 projects over an inch from the side of the computer. In order to protect the internal wiring, USB plug body 260 is rigid. In addition, the USB cable attached to the plug cannot be bent too sharply without risk of cable damage, and in most instances there is a strain relief sleeve 280 (shown in FIG. 2) to prevent the cable from bending at the point it joins body 260. Most commonly, particularly with portable computers such as laptop, tablet and notebook computers, one or more USB ports are located on a rear or side surface of the computer near the bottom surface of the computer. Thus, while FIG. 1A shows USB plug on a side of computer 100, very commonly such plugs are on the rear surface.

Many personal computers are used in a confined space with limited space to accommodate USB plugs projecting from the rear or side of the computer. In such situations the use of USB devices, and their associated connectors, can add an appreciable amount to the space requirements for the system. In addition, when a plug protrudes from the side or rear of a laptop computer near the bottom of a laptop or similar computer, the USB plug and cable, and the computer are at risk of being damaged if the user tilts the system as depicted, for example, in FIG. 1B. FIG. 1B shows computer 100 being tilted to the side, such that the entire weight of the computer is applied at point A near the end of USB connector body 260. Due to the rigidity of body 260 and connector 250 (see FIG. 2) the force applied at point A is transmitted into the port. Thus, the risk is not only to the USB cable and plug, but also to the computer's USB port and, potentially, to the computer motherboard on which the socket 210 is mounted.

Accordingly, there is a need for a USB connectors which reduces the amount of space required to use the USB port on a personal computer. In addition, there is a need for a USB connector that minimizes the risk of damage to the USB plug, cable and port.

SUMMARY OF THE INVENTION

Accordingly, the present invention is directed to a device connector that overcomes the foregoing problems. Thus, in one aspect the invention is directed to a device connector having a housing containing a plug adapted to be inserted into a port of an electronic device, the plug defining a longitudinal axis in the direction of insertion, a replica port coupled to the housing, the replica port being structurally and functionally substantially the same as the port of the electronic device, the replica port being substantially orthogonal to the longitudinal axis. In one embodiment, the replica port is coupled to the housing using a cable, which is preferably orthogonal to the longitudinal axis and is between about 3 and about 5 centimeters long. Preferably, when the housing is plugged into the electronic device port it protrudes from the surface of the electronic device by less than about 2 centimeters. The device connector is preferably has a USB plug and a USB socket. In another aspect, the surface of the housing proximate the electronic device is adapted to contact and conform to a non-planar surface of the electronic device. Preferably, the housing is adapted to engage the surface of the electronic device when in use.

In another aspect the present invention is directed to a USB connector for use with a personal computer, comprising a USB plug attached to a housing, the USB plug defining a longitudinal axis conforming to the direction of insertion of the plug, a cable attached at one end thereof to the housing, the cable defining an axis when unflexed that is orthogonal to the longitudinal axis, the housing having a contact surface adapted to contact and substantially conform to the surface of the personal computer when the USB connector is inserted into a USB socket on the personal computer. At least a portion of the contact surface may have an arcuate shape. Preferably, the USB connector protrudes less than 2 centimeters from the personal computer when connected to the personal computer, and the cable is between about 3 to 5 centimeters long.

BRIEF DESCRIPTION OF THE DRAWINGS

The foregoing aspects and the attendant advantages of this invention will become more readily apparent by reference to the following detailed description when taken in conjunction with the accompanying drawings, wherein.

DETAILED DESCRIPTION

In the following description, numerous specific details are set forth to provide a more thorough description of the specific embodiments of the invention. It is apparent, however, to one skilled in the art, that the invention may be practiced without all the specific details given below. Consistent numbering is used in the Figures.

The preferred embodiment of the present invention is directed to a USB connector for use with a personal computer, which is designed to overcome the problems discussed above. While the preferred embodiment is described as a USB connector for a laptop or other personal computer, the invention has more general applicability to various types of connectors used with various types of electronic devices. In such situations, the connector on the computer or other electronic device is normally a female socket, also referred to herein as a port, due to the risk of damage associated with having a male connector protrude from a surface of the computer. Accordingly, a male connector, also referred to herein as a plug, is inserted into the socket on the device. It is noted that some connectors, such as a network (e.g., "Ethernet") connector or a telephone line connector, are relatively small and/or do not have bodies that protrude from the adjacent surface of the computer. In addition, some simple cables, such as network cables and telephone cables, are relatively thin and highly flexible such that they can be bent without risk of damage. Accordingly, some of the advantages of the present invention are not as pronounced with such connectors.

Figure 1A:
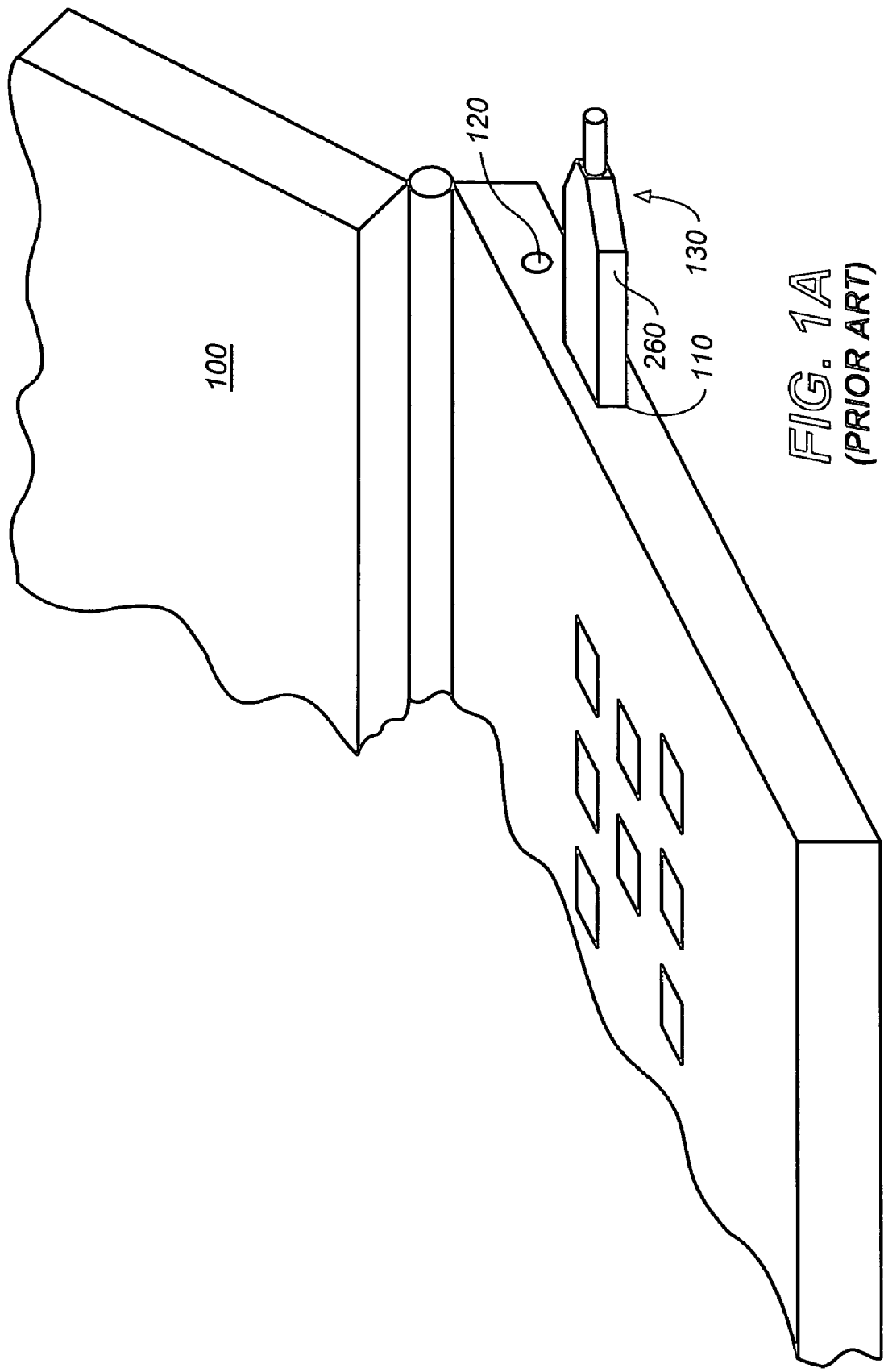
FIG. 1A is a depiction of a prior art USB plug used with a laptop computer.
Figure 1B:
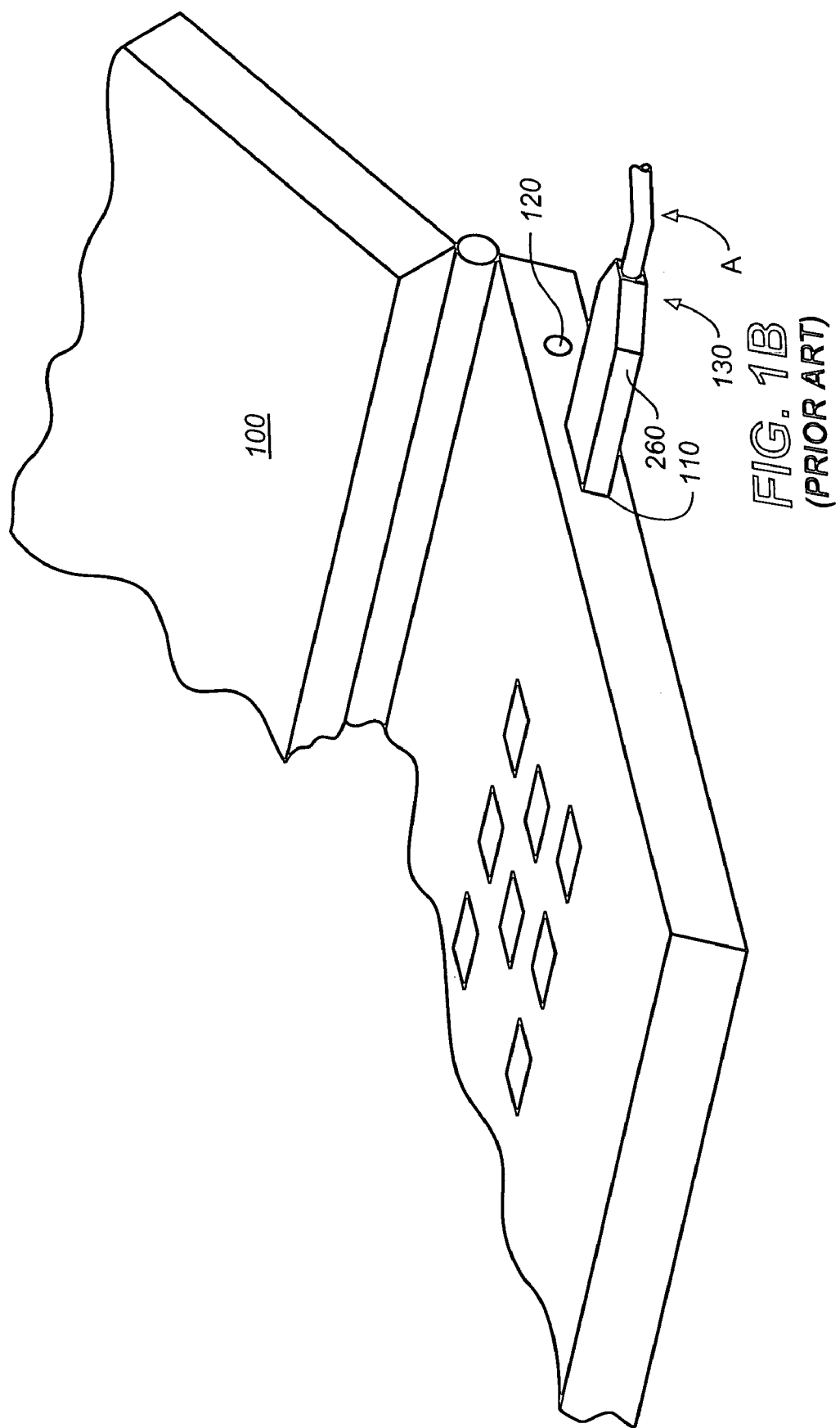
FIG. 1B is a depiction of a prior art USB plug at risk of damage due to tilting of the laptop computer.
Figure 2:
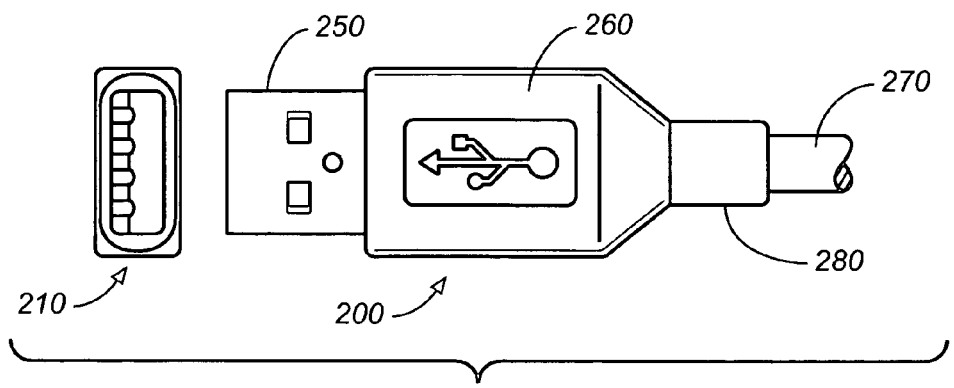
FIG. 2 is a depiction of a standard, prior art USB "A" plug and socket.
Figure 3A:
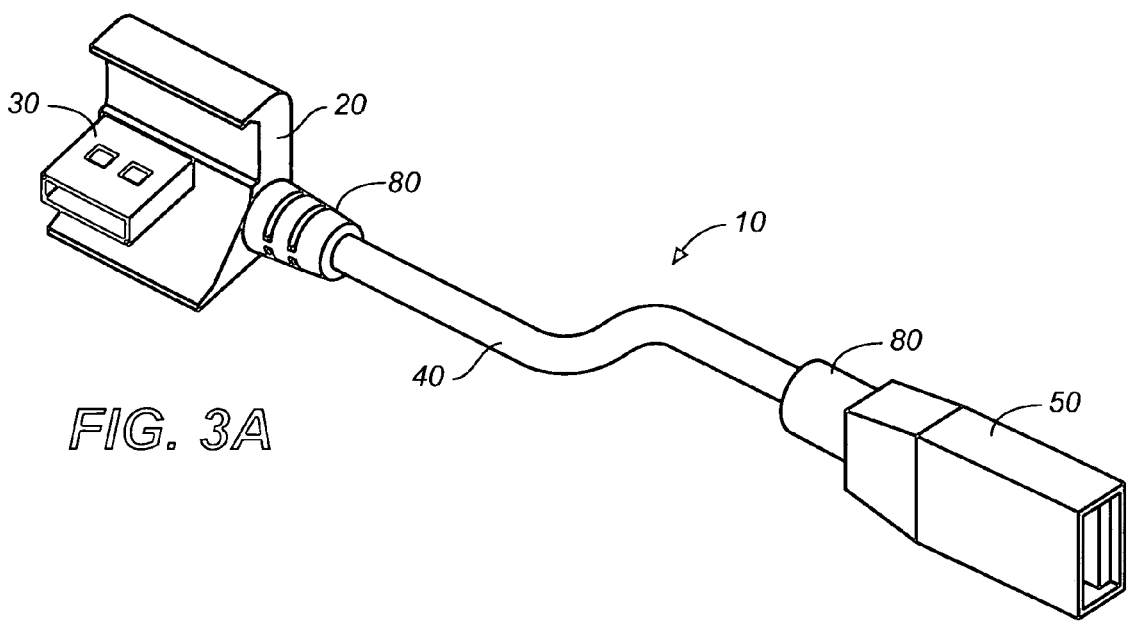
FIG. 3A is a perspective view of a USB connector in accordance with an embodiment of the present invention.
Figure 3B:
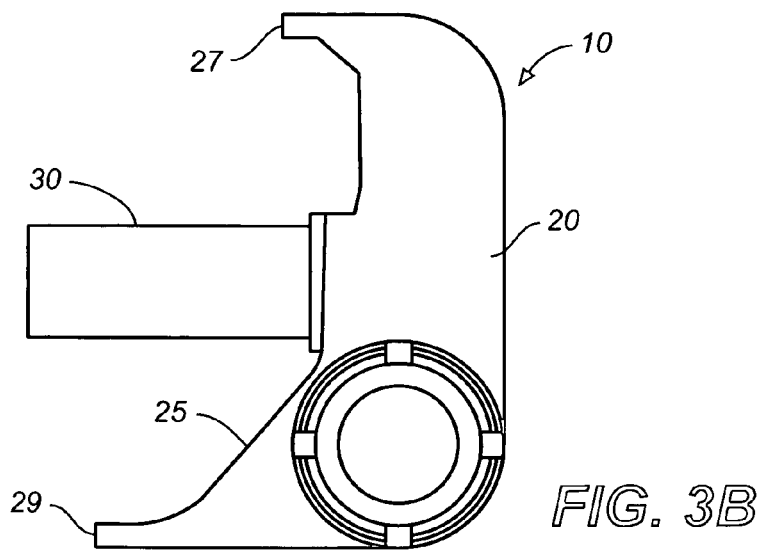
FIG. 3B is a side view of the connector.

FIGS. 3A and 3B show a first embodiment of a connector 10 of the present invention. Connector 10 comprises a housing 20 containing a type A USB plug 30 that is adapted to be inserted into a USB port or socket on a laptop computer. A USB cable 40 is attached to the housing 20 and is coupled at one end to USB plug 30. The other end of USB cable 40 is attached to a type A USB socket 50, also referred to as an extension socket. Preferably, protective strain relief sleeves 80 are positioned where cable 40 is connected to housing 20 and extension socket 50, respectively.

Since extension socket 50 conforms to USB standards, it is functionally and structurally substantially identical to the USB socket on the computer and, therefore, extension socket 50 may also be referred to as a replica port. Thus, when connector 10 is in use, inserting a USB cable into extension port 50 is functionally equivalent to inserting the cable into the computer's USB port, with the exception that the plug no longer protrudes a substantial distance from the computer. Connector 10, therefore, serves as a space saving device. In addition, connector 10 of the present invention helps minimize the risk of damage to the USB cable and to the computer if the computer is tilted. In addition, connector 10 is easily replaced if damaged or worn out, whereas it is very difficult to replace or repair a USB socket mounted on a computer motherboard.

Figure 4A:
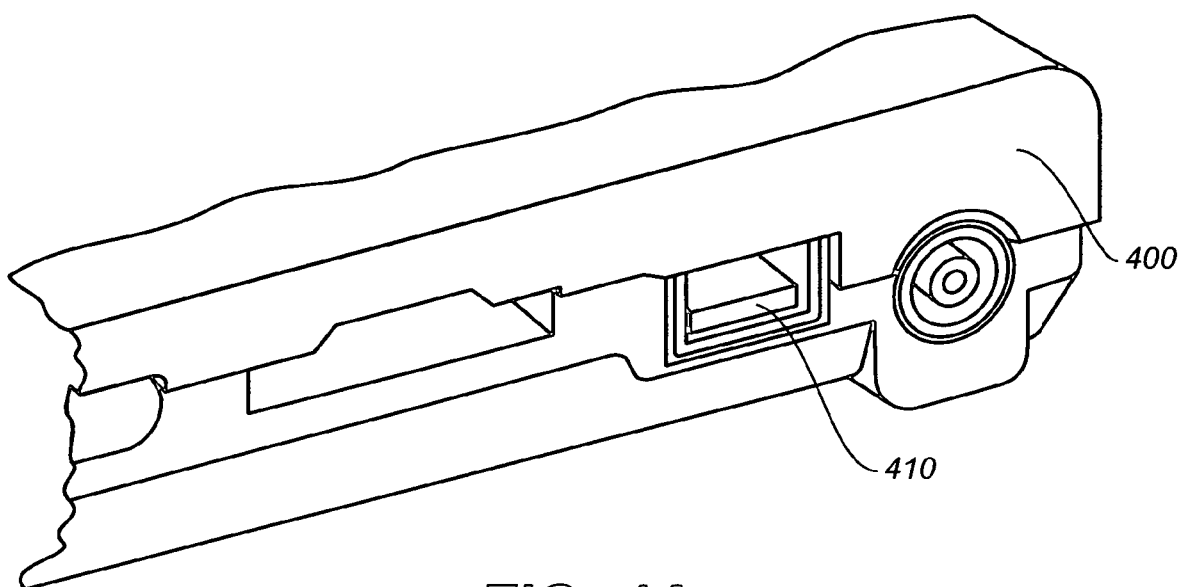
FIGS. 4A and 4B show a side perspective view of a laptop computer and a mating USB connector in accordance with an embodiment of the present invention.
Figure 4B:
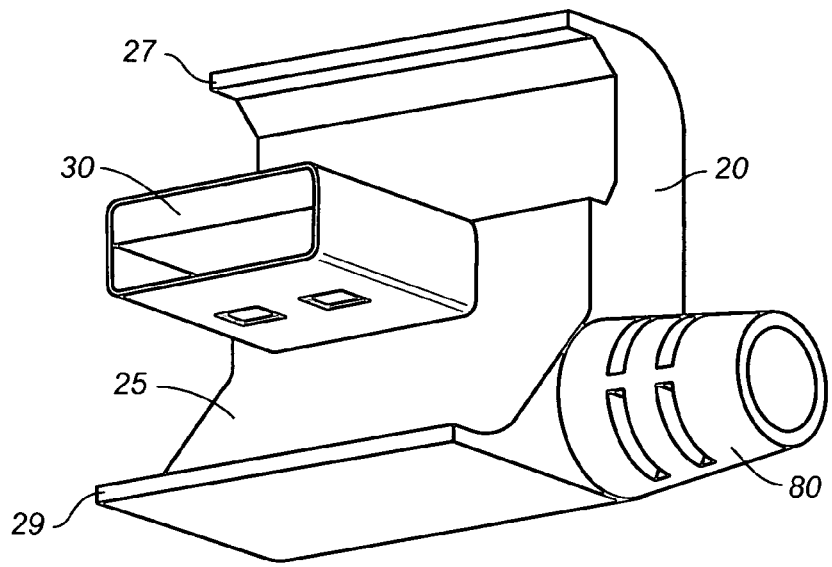

FIG. 4A shows a side view of a laptop computer 400 having a USB port 410. The side of laptop computer 400 in the vicinity of port 410 is not planar. As depicted in FIGS. 3B and 4B, in accordance with another aspect of the present invention, housing 20 has an inner surface 25 that is proximate the computer when connector 10 is in use. At least a portion of inner surface 25 conforms to the adjacent non-planar surface of computer 400 when plug 30 is inserted into port 410. In the embodiment depicted, a portion of contact surface 25 is generally arcuate. This feature of the preferred embodiment of the present invention helps protect the USB plug 30 attached to the housing 20 from accidental damage if the computer is tilted or if the connector is bumped or otherwise subject to mechanical stress. Preferably, when it is inserted into the computer port, connector 10 extends only a very short distance from the adjacent surface of the computer in order to save space. The preferred distance is less than about 2 centimeters. As depicted in FIG. 3A, cable 40 is relatively short, preferably between about 3 to about 8 centimeters, and extends from housing 20 at a right angle to USB plug 30.

In addition to conforming to the computer surface, housing 20 may also have upper and lower lips 27, 29, which extend onto the top and bottom surfaces of computer 100 when the connector is inserted. Lips 27, 29 help maintain connector 10 in the correct position and resist any force that would cause rotation of the connector. In FIGS. 3B and 4B, upper lip 27 is shorter that lower lip 29 so that it does not interfere with closing the laptop. In a further embodiment, housing 20 may have other structures to hold or lock it in position. It will be appreciated that housing 20 is preferably designed with a specific laptop computer in mind.

While in the preferred embodiment of the present invention replica USB port 50 is connected to housing 20 by a cable, in other embodiments, replica port 50 is integrally built into housing 20, such that no cable is required. In another embodiment, there are a plurality of replica ports coupled to housing 20, each of which is coupled to the same computer port. As is well known, USB topology allows multiple USB devices to be attached to the same root hub via a single connector.

The embodiments described above are illustrative of the present invention and are not intended to limit the scope of the invention to the particular embodiments described. Accordingly, while one or more embodiments of the invention have been illustrated and described, it will be appreciated that various changes can be made therein without departing from the spirit or essential characteristics thereof. Accordingly, the disclosures and descriptions herein are not intended to be limiting of the scope of the invention, which is set forth in the following claims.

What is claimed is:

1. A device connector, comprising:
   a housing containing a plug adapted to be inserted into a port of an electronic device, said plug defining a longitudinal axis in the direction of insertion, wherein the housing comprises an inner surface, an upper lip and a lower lip that are adapted to contact and substantially conform to a non-planar surface of said electronic device,
   a replica port coupled to said housing, said replica port being structurally and functionally substantially the same as the port of said electronic device, said replica port being substantially orthogonal to said longitudinal axis, and
   wherein said replica port is coupled to said housing with a cable, said cable being orthogonal to said longitudinal axis at its attachment point to said housing.

2. The device connector of claim 1 wherein said cable is between about 3 and about 8 centimeters long.

3. The device connector of claim 1 wherein when said housing is plugged into said electronic device port it protrudes from the surface of said electronic device by less than about 2 centimeters.

4. The device connector of claim 1 wherein said plug is a type A USB plug and said replica port is a type A USB socket.

5. The device connector of claim 1 wherein at least a portion of the surface of said housing proximate said electronic device is adapted to contact and substantially conform to a non-planar surface of said electronic device.

6. The device connector of claim 1 wherein said housing is adapted to engage an outside surface of the electronic device when in use.

7. A USB connector for use with a personal computer, comprising:

a USB plug attached to a housing, said USB plug defining a longitudinal axis conforming to the direction of insertion of the plug, a cable attached at one end thereof to said housing, said cable being orthogonal to said longitudinal axis at the point of attachment, said housing having a contact surface and upper and lower lips that are adapted to contact and substantially conform to the surface of the personal computer when the USB connector is inserted into a USB socket on the personal computer.

8. The USB connector of claim 7, wherein at least a portion of said contact surface has an arcuate shape.

9. The USB connector of claim 7 wherein said connector protrudes less than 2 centimeters from said personal computer when connected to said personal computer.

10. The USB connector of claim 9 wherein said cable is between about 3 to about 8 centimeters long.

* * * * *